United States Patent
Zhan et al.

(10) Patent No.: US 10,285,537 B2
(45) Date of Patent: May 14, 2019

(54) GRILL DEVICE

(71) Applicant: Tsann Kuen (Zhangzhou) Enterprise Co., Ltd., Zhangzhou (CN)

(72) Inventors: Yixin Zhan, Zhangzhou (CN); Dongmei Chen, Zhangzhou (CN); Wenyu Chang, Zhangzhou (CN); Xiaoyue Zhu, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 313 days.

(21) Appl. No.: 15/239,936

(22) Filed: Aug. 18, 2016

(65) Prior Publication Data

US 2017/0049267 A1 Feb. 23, 2017

(30) Foreign Application Priority Data

Aug. 21, 2015 (CN) .......................... 2015 1 0516496

(51) Int. Cl.
*A47J 37/06* (2006.01)
(52) U.S. Cl.
CPC .................................. *A47J 37/0611* (2013.01)
(58) Field of Classification Search
CPC ........ A47J 37/00; A47J 37/06; A47J 37/0611; A47J 2037/0617; A47J 37/067; A47J 37/0676

USPC ......... 99/326–334, 339, 372, 374, 376, 377, 99/378

See application file for complete search history.

(56) References Cited

U.S. PATENT DOCUMENTS

| | | | | |
|---|---|---|---|---|
| 5,848,567 A | * | 12/1998 | Chiang | A47J 37/06 99/375 |
| 5,937,742 A | * | 8/1999 | Steeb | A47J 37/0611 99/375 |
| 2007/0283821 A1 | * | 12/2007 | May | A47J 37/0611 99/372 |
| 2010/0024662 A1 | * | 2/2010 | Bengtson | A47J 37/0611 99/377 |
| 2014/0261379 A1 | * | 9/2014 | Mehler | A47J 33/00 126/25 R |

* cited by examiner

*Primary Examiner* — Brian W Jennison
(74) *Attorney, Agent, or Firm* — Burris Law, PLLC (57) ABSTRACT

A grill device for cooking a fluidic food material includes a lower grill plate and an upper grill plate. The lower grill plate includes a lower base wall and a lower surrounding wall that extends upwardly from the lower base wall. The lower base wall has at least one lower inclined surface. The upper grill plate removably covers and is operable to uncover the lower grill plate. The upper grill plate cooperates with the lower grill plate to define a cooking space therebetween, and is formed with an opening through which the fluidic food material is fed into the cooking space. The lower inclined surface is for guiding the fluidic food material to flow smoothly and then fill up the cooking space.

18 Claims, 7 Drawing Sheets

GRILL DEVICE

CROSS-REFERENCE TO RELATED APPLICATION

This application claims priority of Chinese Patent Application No. 201510516496.2, filed on Aug. 21, 2015.

FIELD

The disclosure relates to a grill device, more particularly to a grill device that provides uniform heating functionality.

BACKGROUND

Among various types of grill devices, waffle iron is a device particularly used for making waffle, which is made from a batter containing flour, sugar, milk, etc. Examples of various types of waffles are Belgian waffle and Liège waffle. A conventional waffle iron includes a lower grill plate and an upper grill plate that are gridded, that are hinged together, and that cooperatively define a cooking space therebetween. Each of the lower and upper grill plates has a horizontal grill surface. During cooking operation, an uncooked batter is poured onto the horizontal grill surface of the lower grill plate, and the upper grill plate pivots down to cover the lower grill plate with the batter held therebween. The lower and upper grill plates are then heated for heating the batter to make a waffle.

Since the batter has a certain degree of viscosity, the batter cannot spread quickly and evenly on the horizontal grill surface of the lower grill plate by itself. Thus the batter requires manual spreading by an operator before the upper grill plate pivots down to engage the lower grill plate to heat the batter. As a result, the batter cannot be heated and cooked uniformly by the upper and lower grill plates, and it is relatively difficult to obtain a waffle with top and bottom surfaces having the same degree of crispiness.

In addition, if too much batter is poured onto the lower grill plate, an excess amount of the batter may ooze out of the lower and upper grill plates and form crumbs that need to be removed after the batter is heated and solidified, or the excess batter may drip down from the conventional waffle iron and need to be removed for sanitary purpose. If too little batter is poured onto the lower grill plate, the batter may not contact the upper grill plate, and the waffle produced may have an undesirable shape.

A conventional grill device, which may be used to grill steak and/or vegetables, is similar in structure to the conventional waffle iron, with the main difference residing in that the lower and upper grill plates are provided with a plurality of ribs protruding therefrom instead of being gridded. Since the horizontal grill surface of the lower grill plate is flat, a sauce has to be spread manually, which demands attention.

SUMMARY

Therefore, an object of the disclosure is to provide a grill device that can alleviate at least one of the drawbacks of the prior arts.

According to the disclosure, the grill device is used for cooking a fluidic food material. The grill device includes a lower grill unit and an upper grill unit.

The lower grill unit includes a lower grill plate. The lower grill plate includes a lower base wall and a lower surrounding wall that extends upwardly from the lower base wall. The lower base wall has at least one lower inclined surface.

The upper grill unit removably covers and is operable to uncover the lower grill unit. The upper grill unit includes an upper grill plate that cooperates with the lower grill plate to define a cooking space therebetween, and that is formed with an opening through which the fluidic food material is fed into the cooking space.

The at least one lower inclined surface is for guiding the fluidic food material to flow smoothly and then fill up the cooking space.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
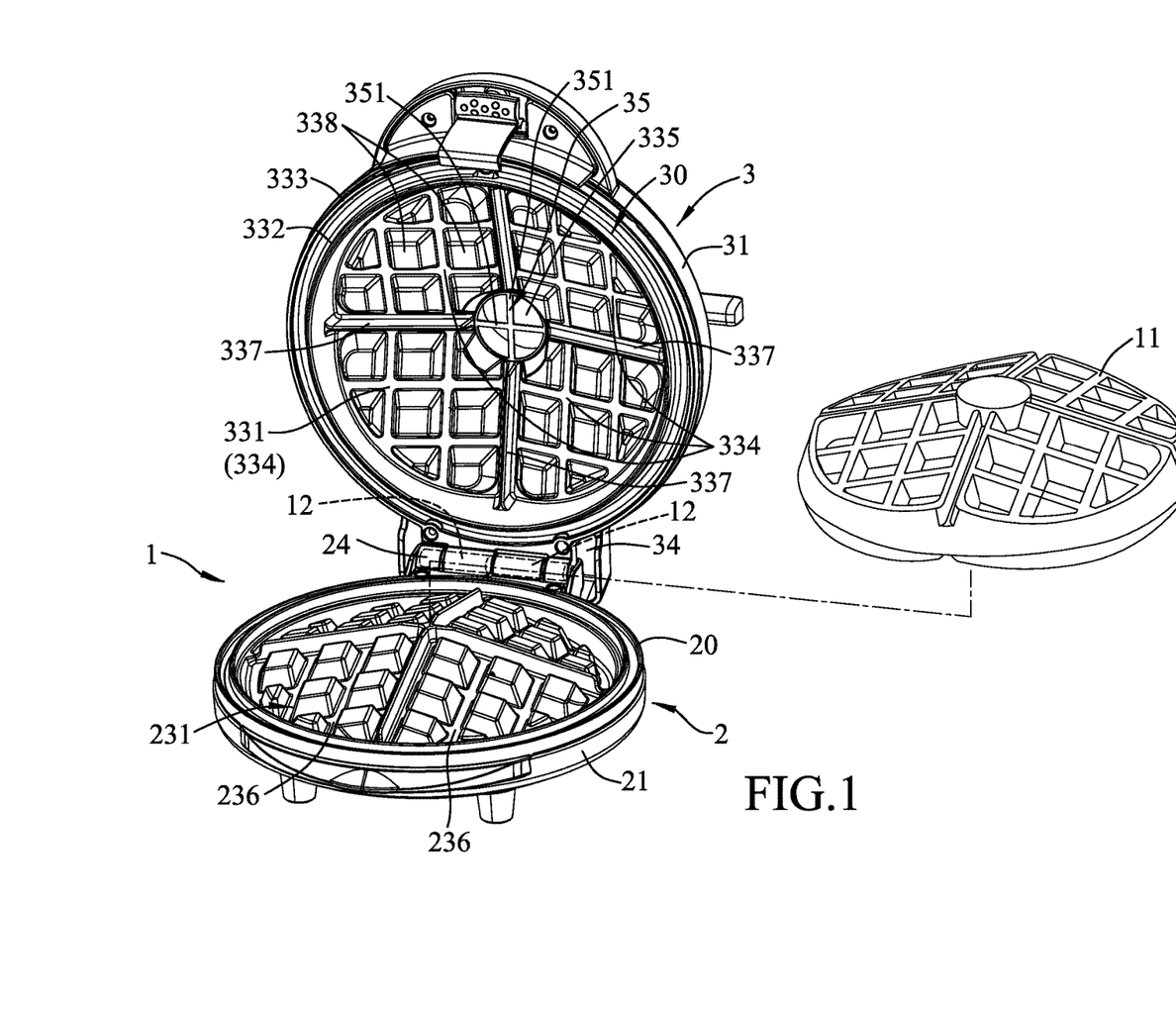
FIG. 1 is a perspective view of a first embodiment of a grill device according to the disclosure and a waffle.
Figure 2:
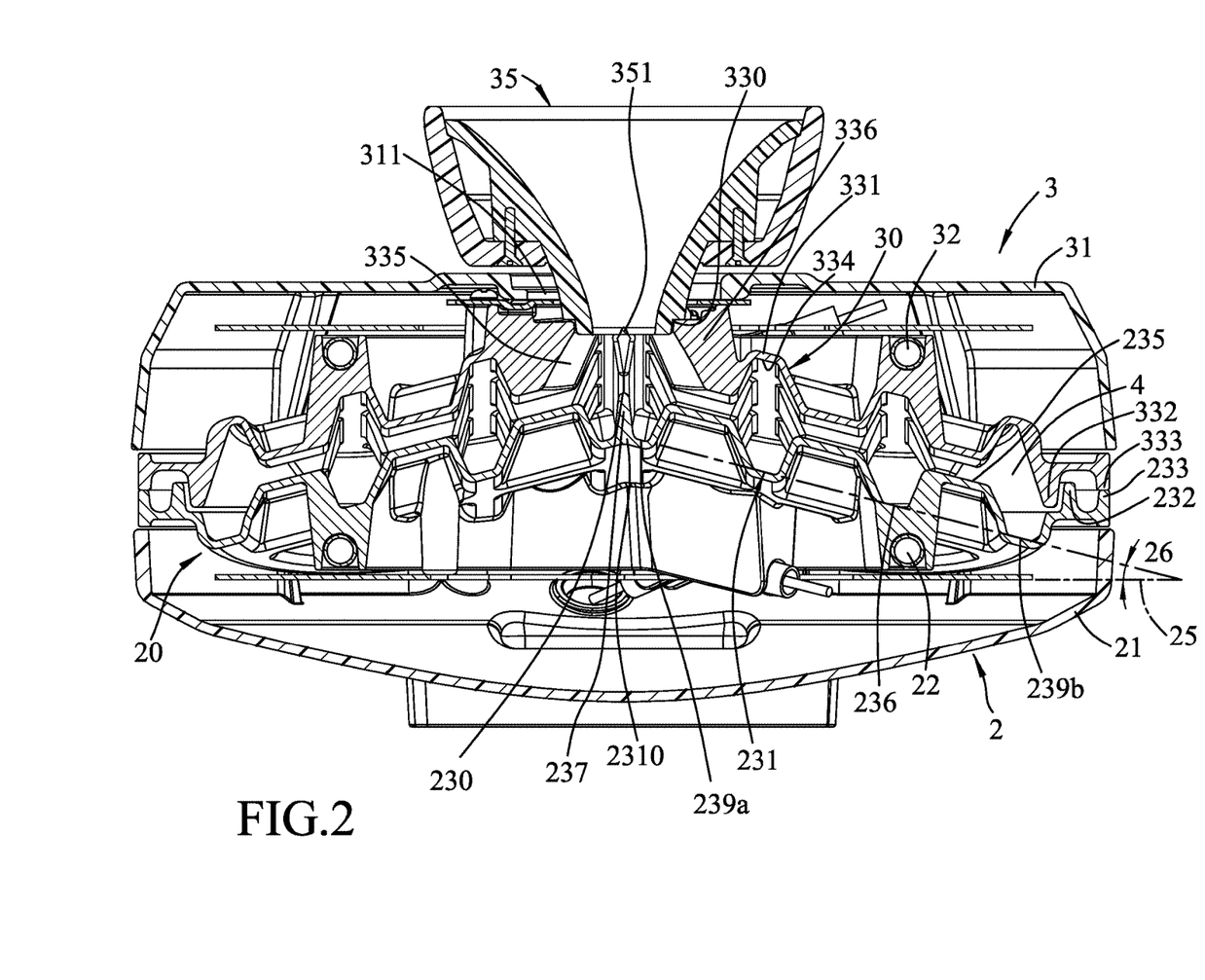
FIG. 2 is a sectional view of the first embodiment, illustrating an upper grill unit covering a lower grill unit.
Figure 3:
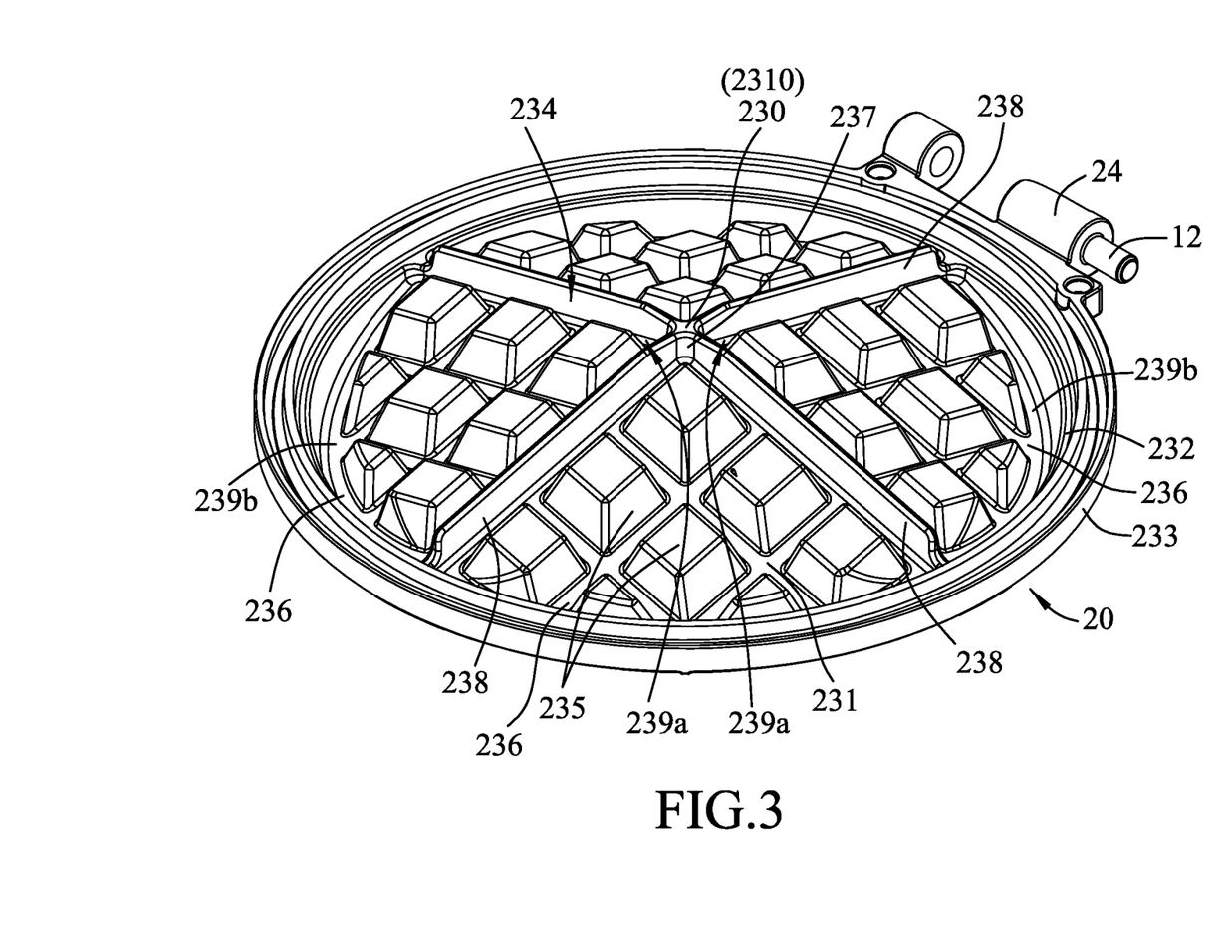
FIG. 3 is a perspective view of a lower grill plate of the lower grill unit of the first embodiment.

Referring to FIGS. 1 to 3, a first embodiment of the grill device 1 according to the disclosure is used for cooking a fluidic food material. The grill device 1 is configured as a waffle iron for making a waffle 11 (see FIG. 1), and the fluidic food material is a batter. The grill device 1 includes a lower grill unit 2 and an upper grill unit 3 that is pivotally connected to the lower grill unit 2 via two pins 12.

The lower grill unit 2 includes a lower grill plate 20, a lower housing 21 in which the lower grill plate 20 is received, and a lower heating member 22. As best shown in FIG. 3, the lower grill plate 20 includes a lower base wall 231 in which the lower heating member 22 is disposed, a lower surrounding wall 232, a lower peripheral wall 233, a section divider 234, and a plurality of spaced-apart lower projections 235. The lower surrounding wall 232 is annular, and extends upwardly from the lower base wall 231.

In this embodiment, the lower peripheral wall 233 is annular, extends upwardly from a periphery of the lower base wall 231, and surrounds and is spaced apart from the lower surrounding wall 232. The lower base wall 231 has a plurality of lower inclined surfaces 236, and a lower pivot portion 24 projecting outwardly from the periphery of the lower base wall 231. The lower inclined surfaces 236 descend from a center 2310 of the lower base wall 231 toward the lower surrounding wall 232. Each of the lower inclined surfaces 236 has an uppermost portion 239a that is adjacent to the center 2310 of the lower base wall 231, and a lowermost portion 239b that is adjacent to the lower surrounding wall 232. In this embodiment, each of the lower inclined surfaces 236 inclines at an angle 26 (see FIG. 2) ranging from 10 degrees to 30 degrees relative to a horizontal plane 25. In one embodiment, the angle 26 of each of the lower inclined surfaces 236 is 20 degrees relative to the horizontal plane 25.

The section divider 234 extends upwardly from the lower base wall 231, and includes a central stage 237 and a plurality of lower dividing ribs 238 diverging from the central stage 237 toward the lower surrounding wall 232. The central stage 237 has a convex top surface 230. Each of the lower inclined surfaces 236 is defined between two adjacent ones of the lower dividing ribs 238.

The lower projections 235 project upwardly from the lower inclined surfaces 236. The lower projections 235 projecting from any one of the lower inclined surfaces 236 are equal in height from a corresponding one of the lower inclined surfaces 236.

Referring back to FIGS. 1 and 2, the upper grill unit 3 removably covers and is operable to uncover the lower grill unit 2. The upper grill unit 3 includes an upper grill plate 30, an upper housing 31 in which the upper grill plate 30 is received, an upper heating member 32, and a cutting set 35.

The upper grill plate 30 corresponds in shape to the lower grill plate 20, and cooperates with the lower grill plate 20 to define a cooking space 4 therebetween. The upper grill plate 30 is formed with an opening 335 which corresponds in position to the uppermost portion 239a of each of the lower inclined surfaces 236, and through which the fluidic food material is fed into the cooking space 4. The upper grill plate 30 includes an upper base wall 331, an upper surrounding wall 332, an upper peripheral wall 333, an annular wall 336, a plurality of upper dividing ribs 337, and a plurality of spaced-apart upper projections 338.

The upper surrounding wall 332 extends from the upper base wall 331 toward the lower grill plate 20, and engage s the lower surrounding wall 232.

The upper peripheral wall 333 surrounds and is spaced apart from the upper surrounding wall 332, and abuts against the lower peripheral wall 233.

The upper base wall 331 corresponds in position to the lower base wall 231. The upper base wall 331 has a plurality of upper inclined surfaces 334 that substantially and respectively correspond in shape to the lower inclined surfaces 236, and an upper pivot portion 34 that projects outwardly from a periphery of the upper base wall 331, and that is pivotally connected to the lower pivot portion 24 of the lower base wall 231 via the pins 12. In this embodiment, each of the upper inclined surfaces 334 has a slope equal to that of a corresponding one of the lower inclined surfaces 236.

The annular wall 336 extends from the upper base wall 331 away from the lower grill plate 20, defines the opening 335, and has a top edge 330 not lower than the cooking space 4.

The upper dividing ribs 337 extend downwardly from the upper base wall 331, and correspond in position to the lower dividing ribs 238, respectively.

The upper projections 338 project downwardly, and correspond respectively in position to and are spaced apart from the lower projections 235.

The upper heating member 32 is disposed in the upper base wall 331. The upper housing 31 is formed with a vertical through hole 311 that is vertically aligned with the opening 335.

The cutting set 35 is hollow, is partially received in the through hole 311, and includes two cutting members 351 that are disposed adjacent to a bottom end of the cutting set 35, and that intersect to form a cross (see FIG. 1). The cutting set 35 is rotatable relative to the upper grill unit 3 so as to cut off a portion of the waffle 11 which is formed by the excess batter that is filled in the cutting set 35. Since the feature of the disclosure does not reside in the specific construction of the cutting set 35, further details of the same are not provided herein for the sake of brevity.

Figure 4:
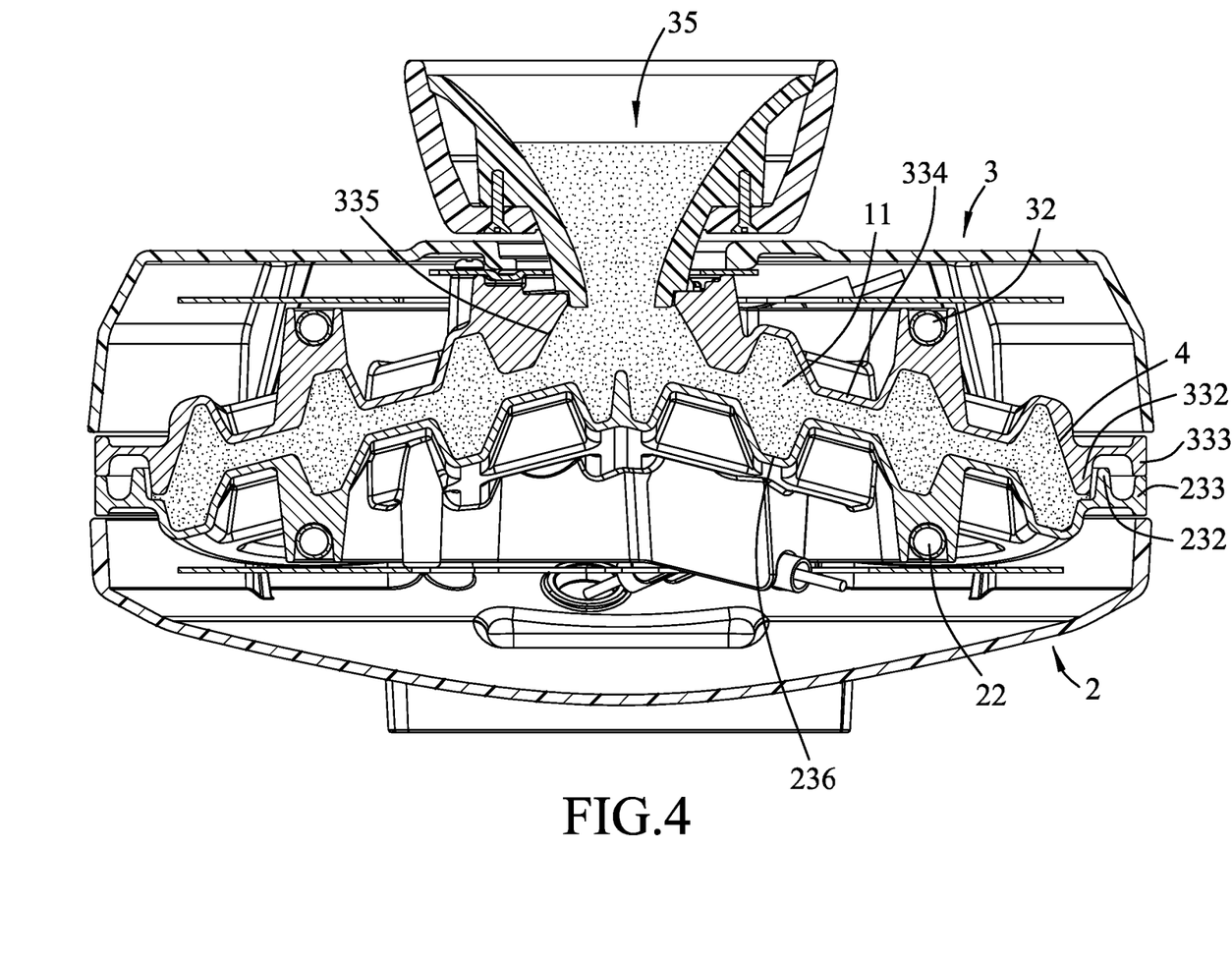
FIG. 4 is a schematic sectional view illustrating how a waffle being made using the first embodiment.

Referring to FIGS. 1, 3, and 4, when in use, the upper grill unit 3 engages the lower grill unit 2, and the batter is poured into the cooking space 4 through the cutting set 35 and the opening 335. The lower and upper inclined surfaces 236, 334 guide the batter to flow smoothly toward the lower and upper surrounding walls 232, 332 and then fill up the cooking space 4. When the batter fills up to the opening 335, it is usually assured that the cooking space 4 is completely filled with the batter. As shown in FIG. 4, since the lower and upper heating members 22, 32 are symmetrically disposed relative to the cooking space 4, the batter can be heated uniformly by the lower and upper heating members 22, 32, so that top and bottom surfaces of the waffle 11 can have the same degree of crispiness.

The opening 335 can be used for observing whether sufficient amount of the batter is poured into the cooking space 4. Since the upper surrounding wall 332 engages the lower surrounding wall 232 and the upper peripheral wall 333 abuts against the lower peripheral wall 233, the batter can be prevented from flowing out of the cooking space 4. The configuration of the top edge 330 of the annular wall 336 being higher than the cooking space 4 provides room for excess batter that may be unintentionally poured into the cooking space 4, so that possibility that the excess batter flows out of the grill device 1 is reduced.

Figure 5:
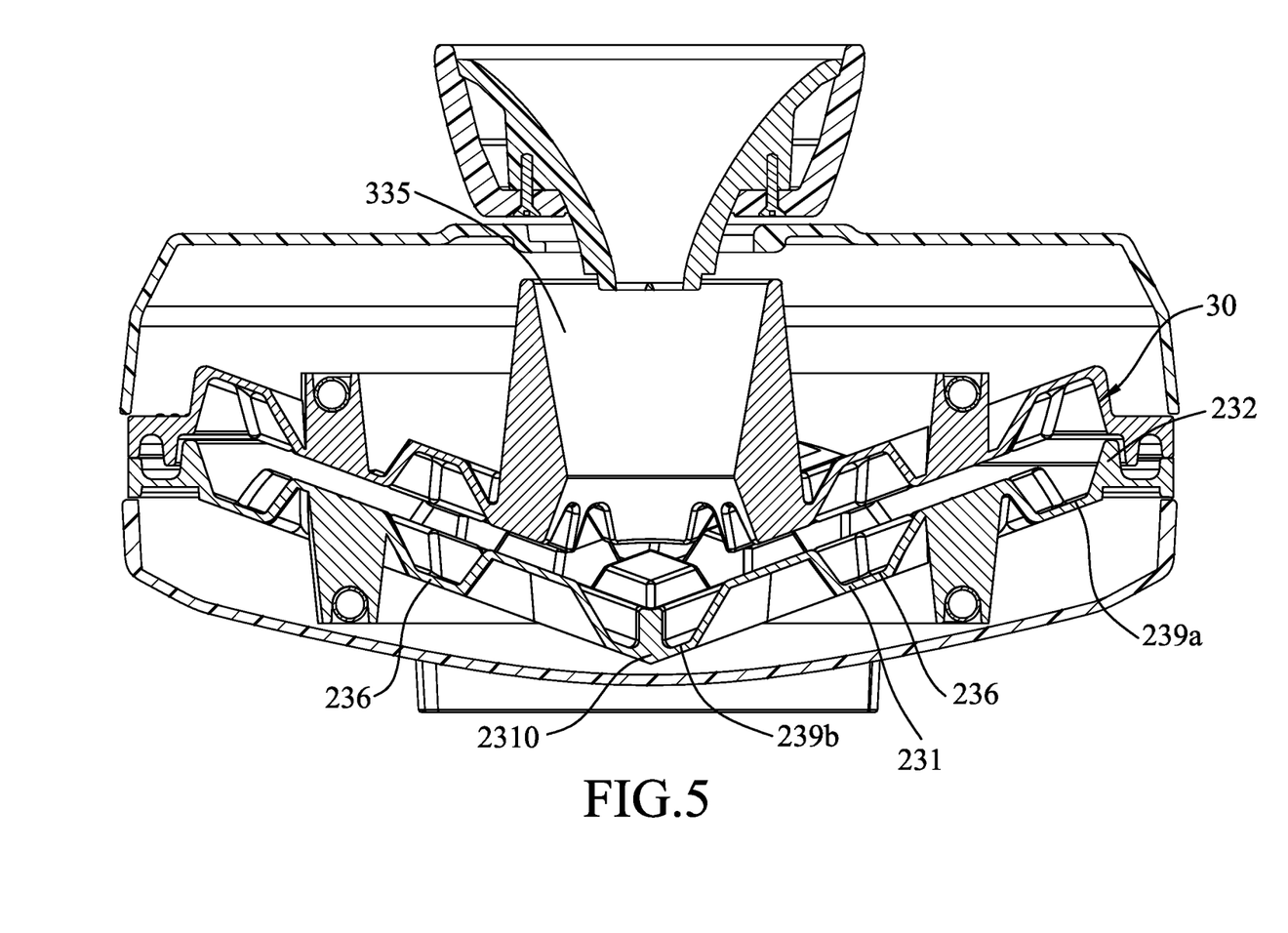
FIG. 5 is a sectional view of a second embodiment of the grill device according to the disclosure.

Referring to FIG. 5, a second embodiment of the grill device 1 according to the disclosure is similar to the first embodiment, the difference between the first and second embodiments residing in that the lower inclined surfaces 236 of the second embodiment descend from the lower surrounding wall 232 toward the center 2310 of the lower base wall 231. The uppermost portion 239a of each of the lower inclined surfaces 236 is adjacent to the lower surrounding wall 232, and the lowermost portion 239b of each of the lower inclined surfaces 236 is adjacent to the center 2310 of the lower base wall 231. The opening 335 of the upper grill plate 30 corresponds in position to the lowermost portion 239b of each of the lower inclined surfaces 236.

It is worth mentioning that the opening 335 may correspond in position to the uppermost portion 239a of any one of the lower inclined surfaces 236. That is, the opening 335 may be formed at a position that is adjacent to the periphery of the lower base wall 231. In certain embodiments, as long as the top edge 330 of the annular wall 336 is configured to be higher than the cooking space 4, the position of the opening 335 is not limited to be adjacent to the center 2310 of the lower base wall 231.

Figure 6:
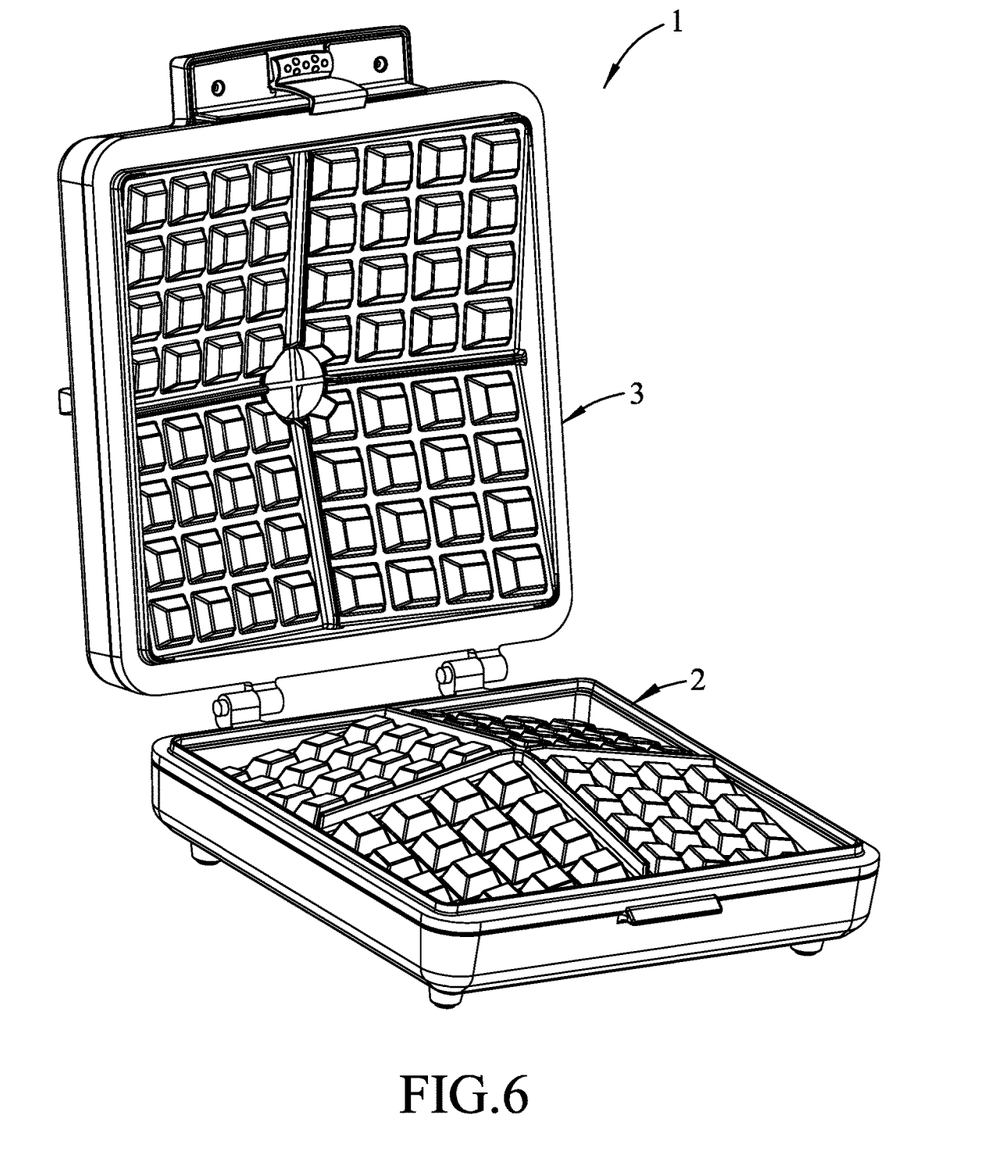
FIG. 6 is a perspective view of a third embodiment of the grill device according to the disclosure.

Referring to FIG. 6, a third embodiment of the grill device 1 according to the disclosure is similar to the first embodiment, the difference between the first and third embodiments residing in that the lower and upper grill units 2, 3 are rectangular . In certain embodiments, the shape of lower and upper grill units 2, 3 and the shape of the waffle 11 (see FIG. 1) made are not limited to be circular or rectangular.

Figure 7:
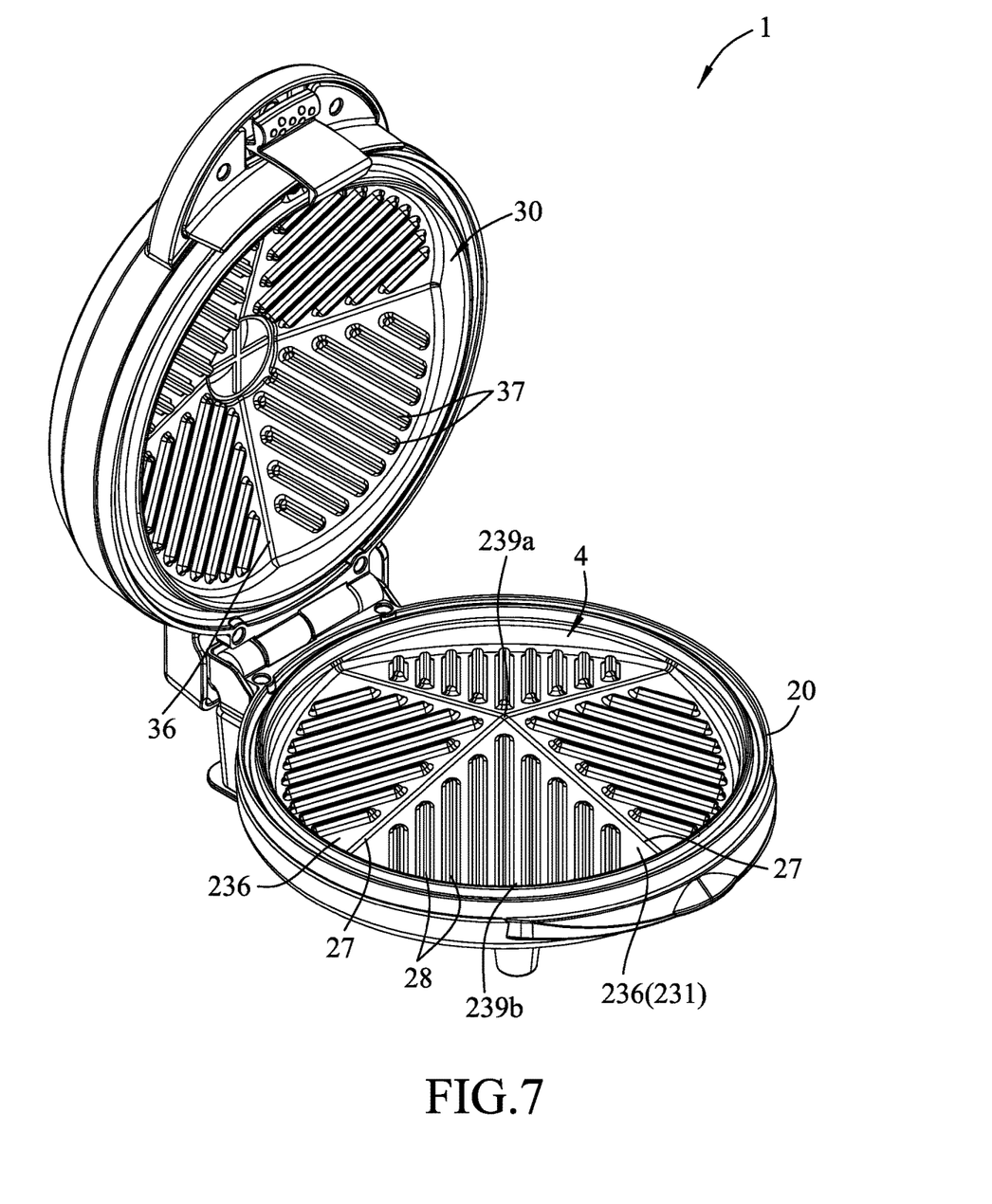
FIG. 7 is a perspective view of a fourth embodiment of the grill device according to the disclosure.

Referring to FIG. 7, a fourth embodiment of the grill device 1 according to the disclosure is similar to the first embodiment, the difference between the first and fourth embodiments residing in that the lower and upper dividing ribs 238, 337 (see FIG. 1) of the first embodiment are respectively substituted by lower and upper dividing ribs 27, 36, and the lower and upper projections 235, 338 and the central stage 237 (see FIG. 3) of the first embodiment are omitted in the fourth embodiment. In the fourth embodiment, the lower grill plate 20 further includes a plurality of spaced-apart protruding ribs 28 projecting upwardly from the lower inclined surfaces 236. The protruding ribs 28 projecting from any one of the lower inclined surfaces 236 are parallel to each other. A middle one of the protruding ribs 28 which projects from any one of the lower inclined surfaces 236 extends from the uppermost portion 239a of a respective one of the lower inclined surfaces 236 toward the lowermost portion 239b of a corresponding one of the lower inclined surfaces 236. The upper grill plate 30 of the fourth embodiment further includes a plurality of spaced-apart protruding ribs 37 projecting downwardly from the upper base wall 331. The protruding ribs 37 of the upper grill plate 30 correspond respectively in position to and are spaced apart from the protruding ribs 28 of the lower grill plate 20.

The grill device 1 of the fourth embodiment may be used for making waffle containing meat and/or vegetables. Uncooked meat and vegetables can be first grilled using the lower and upper grill plates 20, 30, and then the batter can be poured into the cooking space 4 through the opening 335 as described above. The grill device 1 of the fourth embodiment may also be used for grilling steak and/or vegetables. Uncooked steak may be first placed on the lower grill plate 20, the upper grill plate 30 may be moved down to contact the steak to form grill patterns on both top and bottom sides of the steak. By virtue of the configuration of the lower inclined surfaces 236, a sauce may be added through the opening 335 into the cooking space 4 without the need of uncovering the lower grill unit 2, thereby increasing convenience for the operator.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A grill device for cooking a fluidic food material, said grill device comprising:
   a lower grill unit including a lower grill plate, said lower grill plate including a lower base wall and a lower surrounding wall that extends upwardly from said lower base wall, said lower base wall having at least one lower inclined surface; and
   an upper grill unit removably covering and operable to uncover said lower grill unit, and including an upper grill plate that cooperates with said lower grill plate to define a cooking space therebetween, and that is formed with an opening through which the fluidic food material is fed into said cooking space and which has a cross-sectional dimension increasing gradually from said upper grill unit toward said lower grill unit;
   wherein said at least one lower inclined surface guides the fluidic food material to flow smoothly and then fill up said cooking space.

2. The grill device as claimed in claim 1, wherein said at least one lower inclined surface inclines at an angle ranging from 10 degrees to 30 degrees relative to a horizontal plane.

3. The grill device as claimed in claim 2, wherein the angle of said at least one lower inclined surface is 20 degrees relative to the horizontal plane.

4. The grill device as claimed in claim 1, wherein said at least one lower inclined surface descends from a center of said lower base wall toward said lower surrounding wall, and has an uppermost portion that is adjacent to said center of said lower base wall, and a lowermost portion that is adjacent to said lower surrounding wall.

5. The grill device as claimed in claim 4, wherein said opening of said upper grill plate corresponds in position to said uppermost portion of said at least one lower inclined surface.

6. The grill device as claimed in claim 1, wherein said at least one lower inclined surface descends from said lower surrounding wall toward a center of said lower base wall, and has an uppermost portion that is adjacent to said lower surrounding wall, and a lowermost portion that is adjacent to said center of said lower base wall.

7. The grill device as claimed in claim 6, wherein said opening corresponds in position to said lowermost portion of said at least one lower inclined surface.

8. The grill device as claimed in claim 4, wherein said upper grill plate includes an upper base wall that corresponds in position to said lower base wall, and an upper surrounding wall that extends from said upper base wall toward said lower grill plate and that engages said lower surrounding wall, said upper grill plate having at least one upper inclined surface that substantially corresponds in shape to said at least one lower inclined surface.

9. The grill device as claimed in claim 8, wherein said at least one upper inclined surface has a slope equal to that of said at least one lower inclined surface.

10. The grill device as claimed in claim 8, wherein said upper grill plate further includes an annular wall that extends from said upper base wall away from said lower grill plate, said annular wall defining said opening, said annular wall having a top edge not lower than said cooking space.

11. The grill device as claimed in claim 8, wherein said lower grill plate further includes a lower peripheral wall that surrounds and is spaced apart from said lower surrounding wall, said upper grill plate further including an upper peripheral wall that surrounds and is spaced apart from said upper surrounding wall, and that abuts against said lower peripheral wall.

12. The grill device as claimed in claim 8, wherein:
   said lower grill unit further includes a lower housing receiving said lower grill plate therein, and a lower heating member disposed in said lower base wall of said lower grill plate; and said upper grill unit further includes an upper housing receiving said upper grill plate therein, and an upper heating member disposed in said upper base wall of said upper grill plate.

13. The grill device as claimed in claim 8, wherein:
said lower grill plate further includes a section divider that extends from said lower base wall upwardly, and that includes a central stage and a plurality of lower dividing ribs diverging from said central stage toward said lower surrounding wall; and
said lower base wall has a plurality of said lower inclined surfaces each being defined between two adjacent ones of said lower dividing ribs.

14. The grill device as claimed in claim 13, wherein said lower grill plate further includes a plurality of spaced-apart lower projections that project from said lower inclined surfaces upwardly.

15. The grill device as claimed in claim 14, wherein said upper grill plate further includes:
   a plurality of upper dividing ribs 337 extending from said upper base wall downwardly, and corresponding in position to said lower dividing ribs; and
   a plurality of spaced-apart upper projections projecting downwardly, and corresponding in position to and being spaced apart from said lower projections.

16. The grill device as claimed in claim 13, wherein said lower grill plate further includes a plurality of spaced-apart protruding ribs projecting from said lower inclined surfaces upwardly.

17. The grill device as claimed in claim 16, wherein said protruding ribs projecting from any one of said lower inclined surfaces are parallel to each other, a middle one of said protruding ribs projecting from any one of said lower inclined surfaces extending from said uppermost portion of a respective one of said lower inclined surfaces toward said lowermost portion of a corresponding one of said lower inclined surfaces.

18. The grill device as claimed in claim 16, wherein said upper grill plate further includes:
   a plurality of upper dividing ribs extending from said upper base wall downwardly, and corresponding in position to said lower dividing ribs; and
   a plurality of spaced-apart protruding ribs projecting from said upper base wall downwardly, and corresponding in position to and being spaced apart from said protruding ribs of said lower grill plate.

* * * * *